(12) United States Patent
Jacobs et al.

(10) Patent No.: US 6,516,075 B1
(45) Date of Patent: Feb. 4, 2003

(54) HEARING ENHANCEMENT SYSTEM

(75) Inventors: Walter William Jacobs, Edinburgh (GB); Richard Silver, Edinburgh (GB)

(73) Assignee: A. E. Patents Limited, Livingston (GB)

(*) Notice: Subject to any disclaimer, the term of this patent is extended or adjusted under 35 U.S.C. 154(b) by 0 days.

(21) Appl. No.: 09/319,296

(22) PCT Filed: Dec. 1, 1997

(86) PCT No.: PCT/GB97/03312

§ 371 (c)(1),
(2), (4) Date: Dec. 28, 1999

(87) PCT Pub. No.: WO98/25439

PCT Pub. Date: Jun. 11, 1998

(30) Foreign Application Priority Data

Dec. 4, 1996 (GB) .............................................. 9625157

(51) Int. Cl.⁷ .............................................. H04R 25/00
(52) U.S. Cl. ........................ 381/331; 381/312; 381/322; 455/100
(58) Field of Search ........................ 381/331, 326–330, 381/312, 315, 322, 323; 455/100, 351

(56) References Cited

U.S. PATENT DOCUMENTS 3,985,977 A * 10/1976 Beaty
4,070,553 A * 1/1978 Hass
6,307,945 B1 * 10/2001 Hall

FOREIGN PATENT DOCUMENTS

| DE | 32 43 850 A1 | 5/1984 |
| FR | 2 047 021 | 3/1971 |
| FR | 2 619 480 A1 | 2/1989 |
| FR | 2 648 294 A1 | 12/1990 |
| GB | 1 443 157 | 7/1976 |
| WO | 95/01678 | 1/1995 |

* cited by examiner

*Primary Examiner*—Huyen Le
(74) *Attorney, Agent, or Firm*—Drinker Biddle & Reath LLP

(57) ABSTRACT

A hearing enhancement system, for co-operation with a conventional hearing aid used in T-switch mode, comprises a microphone (10), an electronics module (22) including an amplifier and a power supply, and an induction loop (12). The induction loop (12) has a small number (typically 10–20) of conductor turns formed as a flexible assembly of a size suitable to be worn around the body as a sash or belt.

13 Claims, 3 Drawing Sheets

HEARING ENHANCEMENT SYSTEM

BACKGROUND OF THE INVENTION

This invention relates to a system for enhancing the hearing of persons who are hard of hearing and use conventional hearing aids.

Hearing aids as conventionally used are equipped with a T switch which allows inductive coupling of the hearing aid with the ear-piece of a telephone handset. Similar inductive coupling can also be provided by an induction loop to which audio signals are fed via a microphone and amplifier. Inductive loops of this nature are conventionally provided in public places such as churches and halls, the loop being positioned around the public space and fed from a microphone used by a spearer. It is of the essence of loops of this nature that the same signals will be heard by persons using hearing aids at any position within the loop.

It is also known to provide more localised induction loops to enable staff dealing with the public, for example, at Post Offices and railway ticket offices, to converse with a customer. Such installations, however, suffer from the disadvantages that they are relatively complex and expensive to install, and they have a low level of privacy which may be of concern to the hard of hearing in locations such as banks. They also have the drawback that the hearing enhancement can only be provided at fixed locations, and they are therefore unsuitable for use in situations such as large showrooms or hospital consulting suites.

SUMMARY OF THE INVENTION

An object of the present invention is to provide a system for aiding communication with the hard of hearing which avoids or reduces the foregoing disadvantages.

The present invention accordingly provides a hearing enhancement system for use by a first person in communicating with a second person, one or the persons having impaired hearing and using a hearing aid equipped with a selectively actuable inductive coupling (or T switch); the system comprising a microphone, an amplifier, a power supply, and an inductive loop; at least the amplifier power supply and inductive loop being connected together as a unitary article adapted to be readily worn on and removed from the body of one of the persons, and in which the inductive loop is a flexible elongate member which, in use, is worn around the body of said person.

The flexible elongate member may be a permanently closed loop of a size to be worn draped from one shoulder across the user's body. Alternatively, the flexible elongate member may be provided with a releasable closure to enable it to be worn around the waist in the manner of a waist belt.

In one form, the microphone, the amplifier and the power supply are secured directly to the flexible elongate member. Where the flexible elongate member is worn draped across one shoulder, the amplifier and/or the power supply may be positioned at the lowest point of the loop adjacent to the user's waist, with the microphone positioned on the loop to be adjacent to the user's chest or shoulder. Alternatively, a separate microphone may be used.

The power supply may conveniently comprise a re-chargeable battery pack of the type used in portable telephones, or photovoltaic cells, or a combination of these.

The inductive loop may be formed by a length of flexible flat ribbon cable of a type well known per se. The ends of the length of ribbon cable may be joined together by a connector assembly with the conductors of the cable offset by one pitch, thereby forming a multi-turn coil. A 10 conductor or 20 conductor ribbon cable will be suitable for many applications.

The inductive loop or each inductive loop has between 5 and 50 turns. The inductive loop may alternatively be in the form of insulated single-conductor wire wound into a loop which may, for example, be enclosed in a soft plastic sleeve.

Preferably, the inductive loop is provided with switching means by which the user may select a smaller or a larger number of turns (for example, 10 or 20 turns) to provide a selection of very close range (c. 1 m) or close range (c. 2–3 m) communication. Alternatively, there may be a single loop driven by an amplifier the gain of which may be switched between low and high by the user.

One embodiment of the present invention will now be described, by way of example only, with reference to the drawings, in which:

DETAILED DESCRIPTION OF THE PREFERRED EMBODIMENTS

Figure 1:
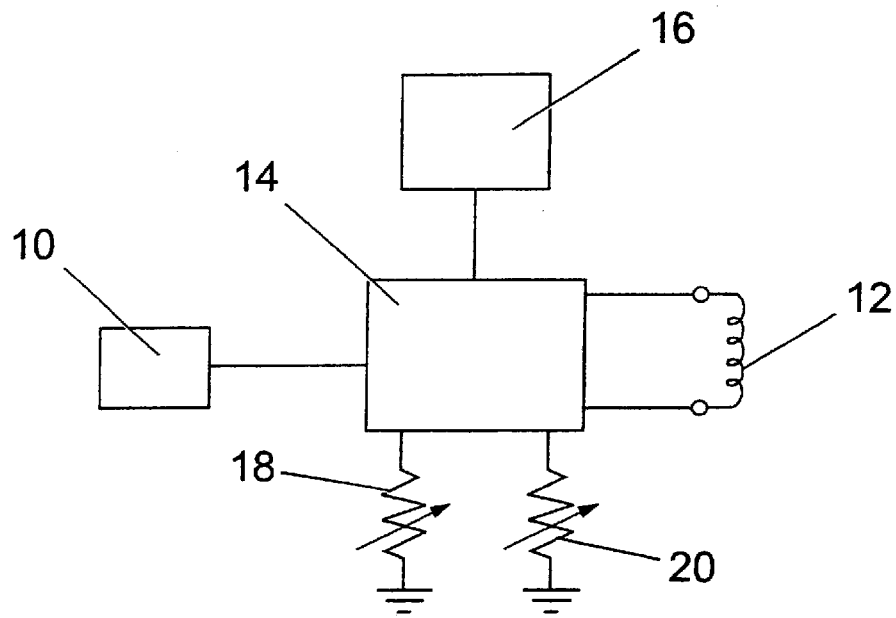
FIG. 1 is a basic circuit diagram of a hearing enhancement system.

Referring to FIG. 1, the system includes a microphone 10 which detects the speech of a user and generates corresponding electrical signals in an induction coil 12 via an amplifier 14. The amplifier 14 is powered by a power supply 16 and may be provided with volume and tone controls as indicated at 18 and 20.

The power supply 16 may comprise a rechargeable battery pack, for example similar to those used in cellular telephones. Alternatively, photovoltaic cells may be used. A particularly preferred form of power supply is to use a combination of rechargeable batteries and photovoltaic cells, which eliminates the need for any intervention by the user such as recharging from mains or replacement of batteries.

Figure 2:
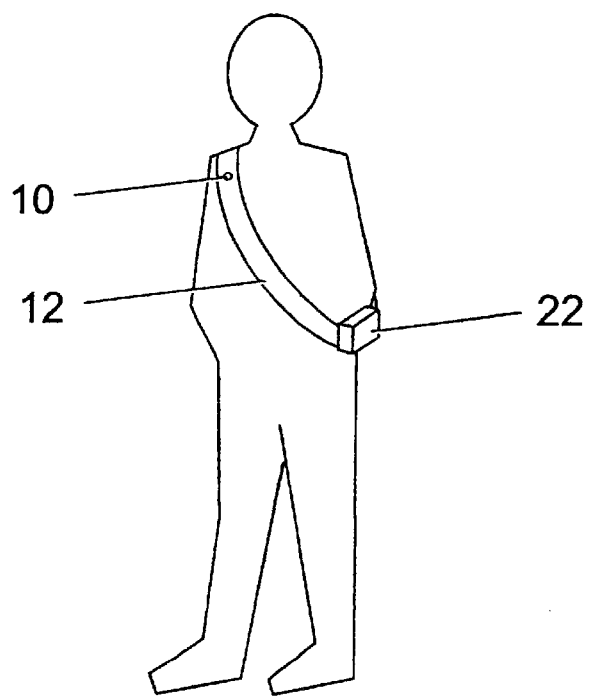
FIG. 2 is a schematic perspective view showing one embodiment of the present invention in use.

Turning to FIG. 2, the system of the present invention is a unitary self-contained system which may be worn around the user. To this end, the induction coil 12 is in the form of a flexible loop which can be draped over the user's shoulder and around his upper body, and the microphone 10 plus a box 22, housing the power supply and the amplifier, are secured to the flexible loop coil 12. The most convenient arrangement is to have the box 22 and the lowest point of the loop, adjacent to the user's waist, and the microphone 10 secured to the loop 12 high on the user's chest to readily detect the user's speech.

The microphone 10 may suitably be provided in the form of two microphones facing in opposite directions along the plane of the loop 12, and acoustically in antiphase. This reduces the transfer of low frequency noise (such as traffic rumble) into the induction loop signal.

Figure 3:
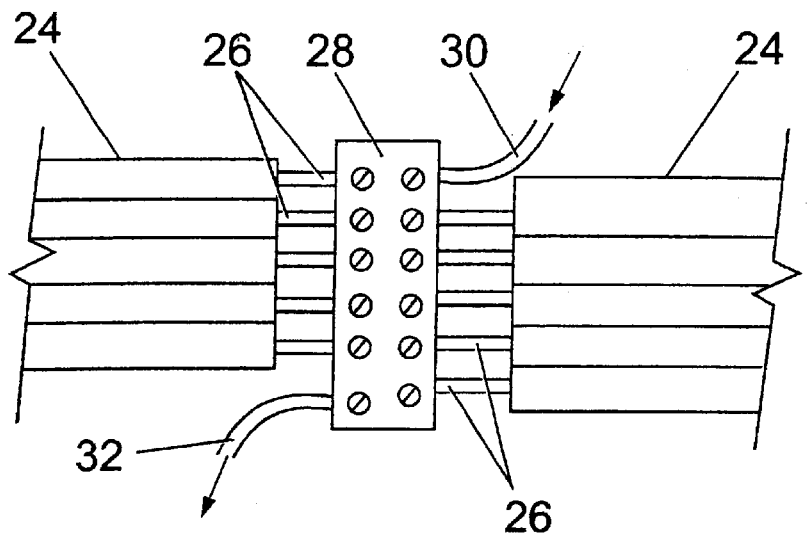
FIG. 3 illustrates the connection of a cable used in the embodiment of FIG. 2.

The inductive loop or each inductive loop has between 5 and 50 turns. The loop 12 may be formed particularly conveniently from a length of flat ribbon cable of the type which is conventionally used to interconnect computer equipment and the like. Referring to FIG. 3, a length of ribbon cable 24 with individual conductors 26 may be joined end to end via a connector block 28 with the individual conductors 26 offset by one pitch, thus forming a multi-turn loop with inlet 30 and outlet 32.

We have found that, surprisingly, a ribbon cable of between 10 and 20 conductors forms a loop which provides high quality signals to hearing aid induction pick-ups, and does so even when the loop is in close proximity to metal, such as the bodywork of a motor car. In such an application, a driving current of between 12 and 55 milliamps is required; with a ten way cable driving currents of 20–25 milliamps has been found to provide an acceptable signal.

The embodiment described provides a useable signal for a distance of some 7 to 8 feet, with the signal concentrated forwardly and rearwardly from the plane of the loop through an angle of about 45° to an axis transverse to the plane of the loop. This ensures that the enhancement is available to the hard of hearing person when the two participants in the conversation are in all normal conversational positions, but provide a high degree of privacy against other hearing aid users relatively nearby.

Figure 4:
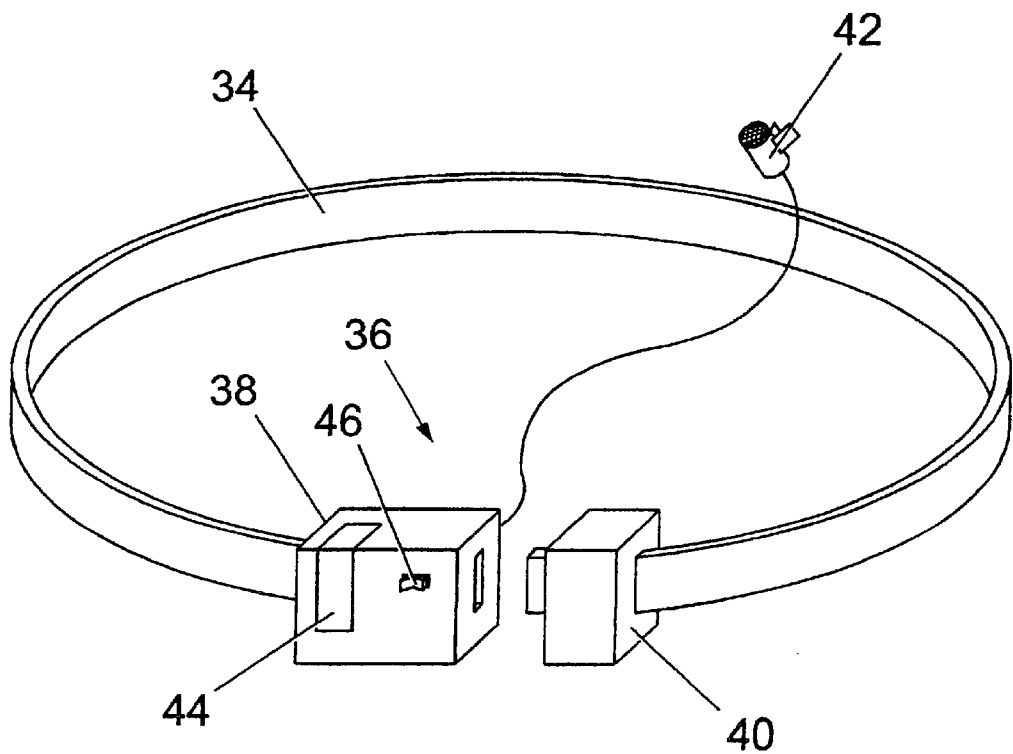
FIG. 4 shows a modified embodiment and FIG. 5 is a block diagram of the embodiment of FIG. 4.

FIG. 4 illustrates a modified version of the foregoing embodiment in which the induction loop is incorporated within a waist belt 34 which is releasably closable by a buckle assembly 36. The buckle assembly 36 has a first part 38 containing the power supply and the amplifier, and a second part 40, these two being connectable by a tongue and slot arrangement which acts as a circuit connector and also activates an on/off switch. The first part 38 incorporates an interchangeable battery pack 40 which may be removed for recharging; nickel/metal hydride batteries are preferred, but lead/acid batteries may also be used. With the embodiment of FIG. 4, it would be preferred to use a microphone, as indicated at 42, which can be positioned by the user to achieve best results, for example on the lapel.

Figure 5:
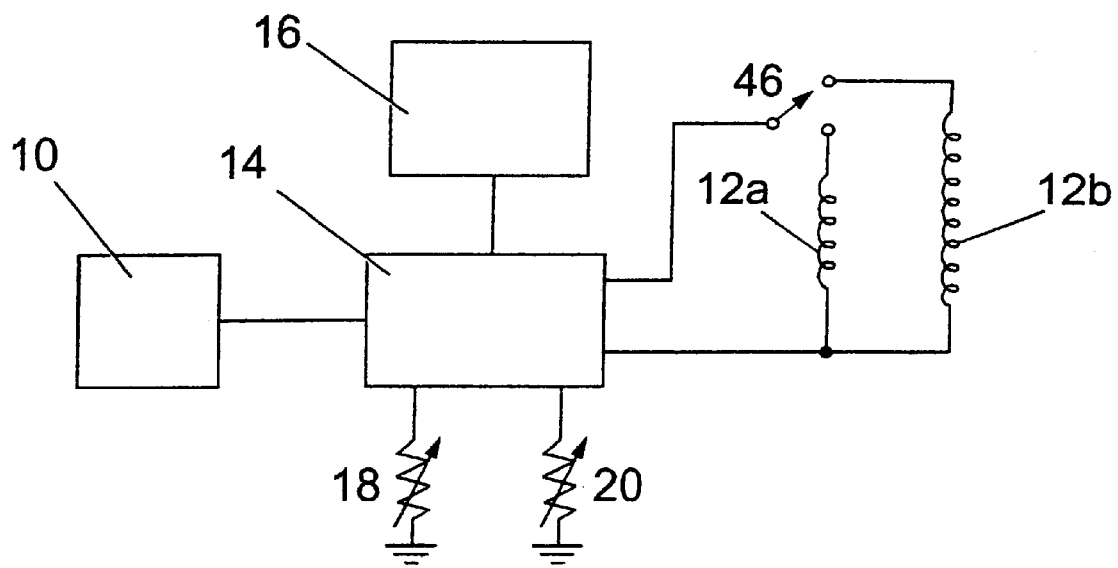

As shown in FIG. 5, the belt 34 contains two induction coils 12a and 12b which may be selected alternately by the user by a switch 46. The coils 12a, 12b are of differing numbers of turns. In one form, the first coil 12a has ten turns of insulated wire and the second coil 12b has twenty turns of insulated wire. This gives a choice of effective range of approximately 1 m and about 2–3 m, respectively, dependent on the degree of privacy desired.

The same effect could be achieved by using a single loop and connecting a switch such as 46 to set the gain of the amplifier either high or low.

The belt 34 may comprise an induction loop within any suitable decorative cover, for example, of leather or fabric. A section of the belt may be looped in an S-shape and provided with a sliding clasp, to provide adjustment of girth. In the embodiment of FIG. 2, the flexible loop 12 may equally be encased within a decorative cover, for example, a cloth sash printed with a suitable legend.

The apparatus of the present invention is primarily intended for wear by a professional person (for example, a medical attendant or a bank official) conducting business with a hard-of-hearing client. It may, however, be used in other ways. It may be worn by the hard of hearing themselves, as it produces superior performance in some situations to the conventional hearing aid alone. The apparatus also has the great benefit of allowing the hard-of-hearing person to hear his own voice, and thus to modulate his voice to suit the circumstances.

The basic unit (such as 38 in FIG. 4) may also be used off the person, such as by being placed on a table or hung on a wall. In this mode, it may be used with the same induction loop (such as 34 in FIG. 4) or alternatively by connected to another induction loop such as a fixed peripheral loop in a room, and for this purpose the basic unit and the induction loop are suitably interconnected by a plug and socket arrangement.

Other modifications and improvements may be made to the foregoing within the scope of the present invention, as defined in the claims.

What is claimed is:

1. A hearing enhancement system for use by a first person in communicating with a second person, one of the persons having impaired hearing and using a hearing aid equipped with a selectively actuable inductive coupling (or T switch); the system comprising a microphone, an amplifier, a power supply, and an inductive loop, the inductive loop in use receiving amplified audio frequency signals from the microphone so as to generate audio frequency inductive signals for receipt by the hearing aid inductive coupling; at least the amplifier, power supply and inductive loop being connected together as a unitary article adapted to be readily worn on and removed from the body of one of the persons, and in which the inductive loop is a flexible elongate member which, in use, is worn around the body of said person; and in which the inductive loop is provided with switching means by which the user may select a smaller or a larger number of turns to provide a range selection.

2. A system according to claim 1, in which the flexible elongate member is a permanently closed loop of a size to be worn draped from one shoulder across the user's body.

3. A system according to claim 2, in which the microphone, the amplifier and the power supply are secured directly to the flexible elongate member.

4. A system according to claim 3, in which the amplifier and/or the power supply is positioned at the lowest point of the loop adjacent to the user's waist, with the microphone positioned on the loop to be adjacent to the user's chest or shoulder.

5. A system according to claim 1, in which the flexible elongate member is provided with a releasable closure to enable it to be worn around the waist in the manner of a waist belt.

6. A system according to any of claims 1 to 5, in which a microphone is used which is positioned separately from the flexible elongate member.

7. A system according to any of claims 1–4, in which the power supply comprises a re-chargeable battery pack of the type used in portable telephones, or photovoltaic cells, or a combination of these.

8. A system according to any of claims 1–3, in which the inductive loop is formed by a length of flexible flat ribbon cable.

9. A system according to claim 8, in which the ends of the length of ribbon cable are joined together by a connector assembly with the conductors of the cable offset by one pitch, thereby forming a multi-turn coil.

10. A system according to any of claims 1 to 3, in which the inductive loop is in the form of insulated single-conductor wire wound into a loop.

11. A system according to claim 10, in which said wire loop is enclosed in a soft plastic sleeve.

12. A system according to any of claims 1–3, in which the inductive loop, or each inductive loop, has between 5 and 50 turns.

13. A system according to claim 1, in which the user may switch between an inductive loop having about 10 turns and an inductive loop having about 20 turns.

* * * * *